United States Patent
Corbin et al.

(10) Patent No.: US 7,492,365 B2
(45) Date of Patent: Feb. 17, 2009

(54) METHOD AND SYSTEM FOR FONT BUILDING

(75) Inventors: Toby Corbin, Southampton (GB); Gordon Hutchison, Eastleigh (GB); William Smith, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 11/133,429

(22) Filed: May 19, 2005

(65) Prior Publication Data

US 2005/0275656 A1    Dec. 15, 2005

(30) Foreign Application Priority Data

Jun. 15, 2004   (GB)   ................. 0413261.9

(51) Int. Cl.
    *G06T 11/00* (2006.01)
(52) U.S. Cl. ................ 345/468; 345/467; 345/471
(58) Field of Classification Search ........... 345/467, 345/471, 468; 358/1.11, 1.1; 707/10; 709/203, 709/219, 223
    See application file for complete search history.

(56) References Cited

U.S. PATENT DOCUMENTS

| 5,206,736 | A | * | 4/1993 | Simpson | ............. 358/1.11 |
| 5,666,478 | A | * | 9/1997 | Nishikawa | ............. 345/468 |
| 5,870,084 | A | | 2/1999 | Kanungo et al. | ............. 345/192 |
| 5,940,581 | A | * | 8/1999 | Lipton | ............. 358/1.11 |
| 6,065,008 | A | * | 5/2000 | Simon et al. | ............. 345/467 |
| 6,141,002 | A | | 10/2000 | Kanungo et al. | ............. 345/327 |
| 6,252,671 | B1 | | 6/2001 | Peng et al. | ............. 358/1.11 |
| 6,313,920 | B1 | * | 11/2001 | Dresevic et al. | ............. 358/1.11 |
| 6,320,587 | B1 | * | 11/2001 | Funyu | ............. 345/467 |
| 7,064,758 | B2 | * | 6/2006 | Chik et al. | ............. 345/467 |
| 2002/0010725 | A1 | | 1/2002 | Mo | ............. 707/530 |
| 2002/0087702 | A1 | * | 7/2002 | Mori | ............. 709/228 |

FOREIGN PATENT DOCUMENTS

| JP | 02251895 A | * | 10/1990 |
| JP | 2000272179 A | * | 10/2000 |
| WO | 0191088 | | 11/2001 |

OTHER PUBLICATIONS

Apple Computer, "Using and Managing Fonts in MAC OS X", pp. 3-18, 2003.*

* cited by examiner

*Primary Examiner*—Chante Harrison
(74) *Attorney, Agent, or Firm*—Duke W. Yee; Herman Rodriguez; Wayne P. Bailey

(57) ABSTRACT

A method and system for font building by providing for the downloading of a subset of glyphs at a client device from a server. The subset can include one or more particular requested glyphs. The subset is accompanied by one or more further glyphs determined by selection criteria, which can include: frequency of use of the glyphs in a particular language; frequency of use of the glyphs by at least one client device; and relationships between particular glyphs.

4 Claims, 3 Drawing Sheets

METHOD AND SYSTEM FOR FONT BUILDING

FIELD OF THE INVENTION

This invention relates to the building of characters (e.g., for visual display or printing) on an output medium of a device, involving the use of a font stored in a font file.

BACKGROUND OF THE INVENTION

In the field of this invention it is known that the display of characters on an output medium of a device involves the use of a font, stored in a font file of some format, and comprising many glyphs each representing a character portion. If a required character glyph is not available to the device, an appropriate font file is typically obtained (e.g., via a network download). Such font files can be large, especially where a character set includes a large number of characters (such as a Chinese character font comprising in excess of 20,000 characters).

However, this approach has the disadvantage(s) that downloading such font files over a network can therefore be time consuming, and local storage on a client device may not accommodate the entire font file.

Although it is known to download to a device only those subset(s) of glyphs or metadata that the device requests, this only partly alleviates the problem, and it still requires further download(s) whenever a glyph is required that the device has not yet been requested.

A need therefore exists for a method and arrangement for font building wherein the abovementioned disadvantage(s) may be alleviated.

SUMMARY OF THE INVENTION

In accordance with one aspect of the present invention there is provided a method of font building at a client computer system cooperating with a server computer system. such that the client requests from the server a subset of glyphs from a font, and the server provides to the client the requested subset of glyphs and at least one further glyph determined by at least one selection criterion at the server.

In accordance with another aspect of the present invention, the determination to specify the at least one further glyph is based on the frequency of glyphs in the language, or frequency of use of glyphs by at least one client. Another determination to specify the at least one further glyph is based on the relationship between the at least one further glyph and at least one of the requested glyphs. Still, in another determination to provide the at least one further glyph. the server adjusts the number of glyphs to send to the client in order to achieve an acceptable download time.

In accordance with still another aspect of the present invention involves operating a server computer system in cooperation with a client computer system, such that the server receives from the client a request for a subset of glyphs from a font, and the server provides to the client the requested subset and at least one further glyph determined by at least one selection criterion.

Another form of the present invention is the system for font building comprising a client computer system in cooperation with a server computer system. such that the client requests from the server a subset of glyphs from a font, and the server provides to the client the requested glyphs and at least one further glyph determined by at least one selection criterion at the server.

In yet another form of the present invention is the computer program product in a computer readable medium for font building. The computer program product comprises computer readable code means on a computer usable medium, for performing font building by a client computer system cooperating with a server computer system, with instruction means enabling a client to request from the server a subset of glyphs from a font, and instruction means enabling the server to provide to the client the requested subset of glyphs and at least one further glyph determined by at least one selection criterion at the server.

BRIEF DESCRIPTION OF THE DRAWINGS(S)

One method and arrangement for font building incorporating the present invention will now be described, by way of example only, with reference to the accompanying drawing (s), in which.

DESCRIPTION OF PREFERRED EMBODIMENT(S)

Figure 1:
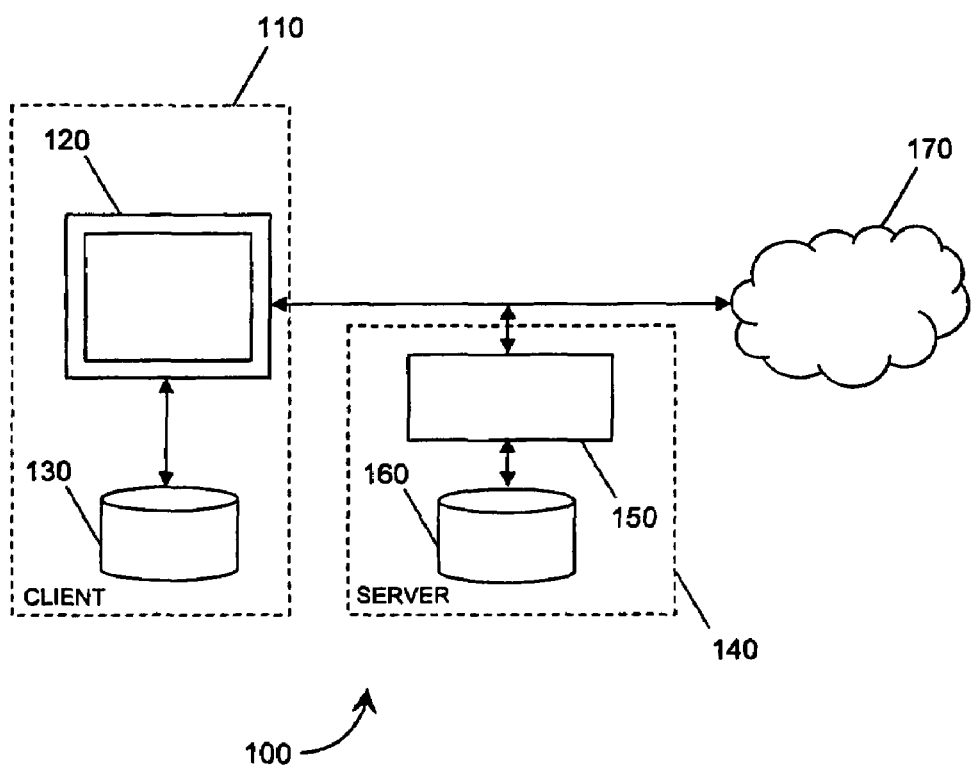
FIG. 1 is a block schematic diagram of a system including a font rendering computer for, inter alia, browsing the internet.

Referring firstly to FIG. 1, a computer system 100, in which the invention is used, is shown. In the system 100, a client computer 110 (having a visual display screen 120 and local processor and memory 130) is linked to a server 140 (including controller 150 and memory 160) and to the internet 170. The client computer 110 displays on the screen 120 characters that it generates internally (e.g., from within a text-processing application) or that it receives from the internet 170 (e.g., browsing a web page containing text). The computer 110 typically keeps some fonts in its memory 120 for commonplace display, but particularly (although not exclusively) when browsing a web page from the internet, it may encounter a need to display a character that it does not have in its memory.

In this event, the client 110 requests a download of a subset of font glyphs (which may be significantly quicker than downloading an entire font) from the server 140; the requested subset includes glyphs for characters that it needs to display but which are not presently in its memory 120. The server 140 provides to the client 110 the requested subset.

However, in addition to the requested subset the server 140 also provides to the client one or more further glyphs that might be expected to be of use to the client. The further glyph(s) sent from the server's memory 160 to the client are determined by the server on the basis of one or more selection criteria, as will be explained in greater detail below. In a preferred implementation, the subset of glyphs can be provided in a standard format of font file (such as TrueType) which is incompletely or sparsely populated (i.e., glyphs are provided for only a subset of all characters accommodated within the font file).

For ease of use, the client 110 communicates with server 140 (sending its request, and receiving the requested and further character glyphs) via commonplace HTTP (Hyper-Text Transfer Protocol) rather than the font server using its own protocol, as is known, to provide data.

Glyphs are stored locally at the client device (in memory, e.g. in a font file), and new glyphs are added when received from the server. Additionally, in response to resource criteria at the client device (such as storage space constraints) glyphs can be removed from the storage of the client device, with the removed glyphs determined by specified criteria (such as those least frequently used).

Thus the server 140 sends more glyphs than the client 110 requests, based on a prediction of other glyphs that the client will need in the near future. This scheme of sending slightly more glyphs than are immediately required is an attempt to minimise the number of requests the client has to make, in order to reduce the overhead of making requests.

Figure 2:
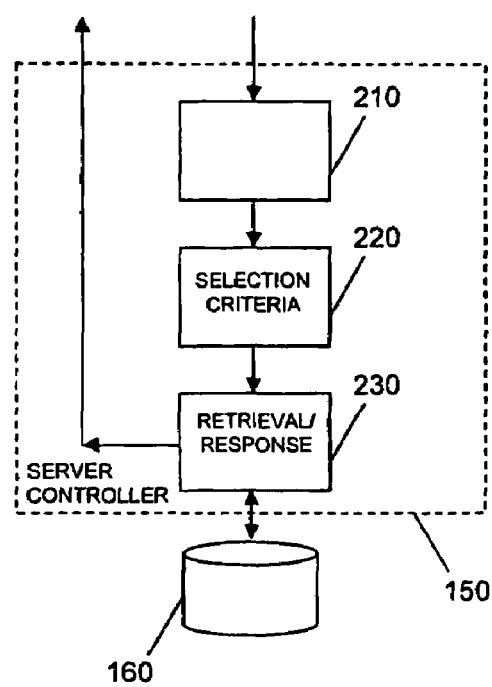
FIG. 2 is a block schematic diagram showing in greater detail part of the system of FIG. 1.

Referring now to FIG. 2, the server controller 150 includes a part 210 for receiving a request from the client 110 for a subset of character glyphs, a selection criteria determination part 220 for determining which further glyph(s) should be further sent with the requested subset, and a retrieval and response part 230 for retrieving the necessary glyphs from memory 160 and forming and sending them to the client 110 in a sparsely populated TrueType file format as mentioned above.

Figure 3:
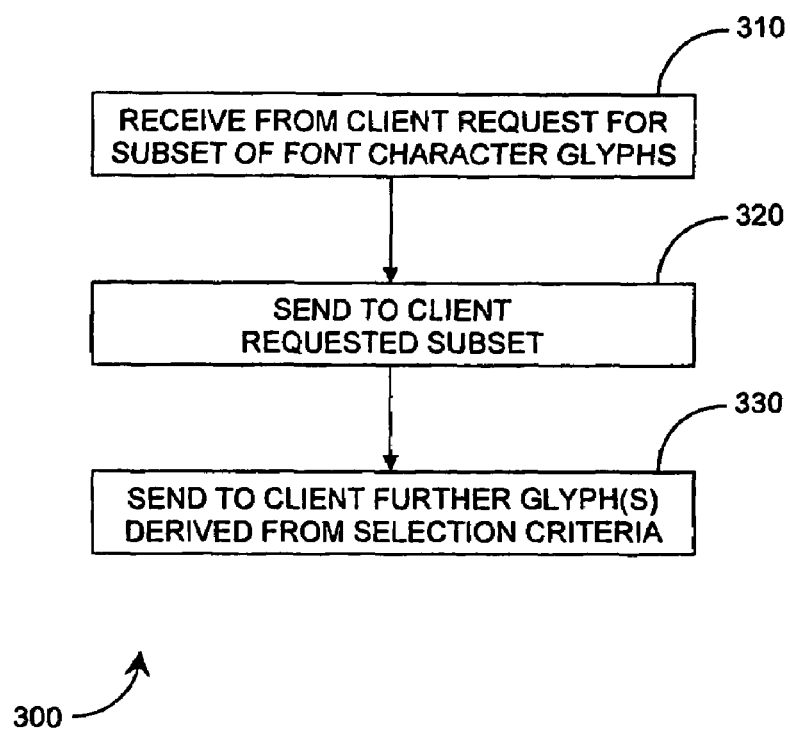
FIG. 3 is a block flow diagram showing operation of a server in the system of FIG. 1 and FIG. 2.

Referring now to FIG. 3, the server 140 can be undestood as following the process 300:

firstly (step 310), the server 140 receives from the client 110 a request for a subset of font character glyphs;

secondly (step 320), the server 140 sends to the client the requested subset (retrieved from memory 160); and thirdly (step 330), the server 140 sends to the client the further glyph(s) (also retrieved from memory 160) derived from the selection criteria.

The selection criteria algorithm for the prediction of which glyphs the client will need soon may be based on the following:

- frequency of use of the glyphs in a particular language (glyphs with a greater or equal frequency than those requested may be further sent; e.g., the character "e" is more commonly used in English than "q", so if the requested subset is all in English then glyphs for the character "e" might be further sent if not already requested);
- frequency of use of the glyphs at the client device (for a glyph already on the client device, a count will be kept of the number of times that glyph has actually been used, and this data is then used to help in the re-ordering of the additional glyphs that can get sent to a client; e.g., if the glyph in question is only used once and is currently in a group of glyphs that have a high usage, it can be replaced in the group by a higher usage glyph).
- frequency of use of the glyphs by a group of client devices similar to the client 110 (since the client 110 can be expected to need such glyphs in the future if they are requested from the server with the same or greater frequency by other similar client devices);
- relationships between particular glyphs (e.g., glyphs all relating to a particular mathematical, medical or legal usage, so that for example if the requested subset contains a Chinese ideograph for a medical term character glyph then all similar medical ideograph glyphs could further be sent if not already requested);
- glyphs most commonly used in the local language but shown by 'opaque data' sent with the glyph request to be not present on the client computer.

The 'opaque data' sent by the client with the request can also indicate which subsets of glyphs are present on the client, and also how often each of these subsets are 'hit'. That is, how often each subset successfully supplies a glyph for display on the client screen. This hit rate data is important to the server so that it can calculate over time which glyphs are most commonly displayed by the clients that it is serving.

The server tries to adapt to the needs of the clients it serves in two ways: 1) it adjusts the number of glyphs it sends together in each 'chunk', to achieve an acceptable download time for the chunk (to avoid excessive delay for the user); 2) it reorganises the chunks of glyphs if their request frequency changes over time (the chunks are reorganised so that each chunk contains only the most requested/used glyphs; it is more efficient, when determing which chunks to send with a requested glyph, to send glyphs that have a high request/usage count rather than those that have a low count; this gives a greater probability that the sent chunk will in fact contain glyphs that the client might need later on; it may be that over time glyph usage changes for whatever reason, and so this will allow the server to change along with it).

It will be appreciated that the method for font building described above may be carried out in software running on one or more processors (not shown) in the server and if desired in the client device, and that the software may be provided as a computer program element carried on any suitable data carrier (also not shown) such as a magnetic or optical computer disc.

It will be understood that the method and arrangement for font building described above provides the advantage that it reduces the need for font/glyph download.

What is claimed is:

1. A method of font building at a client computer system cooperating with a server computer system, the method comprising:

requesting by the client from the server a subset of glyphs from a font, the subset of glyphs being ones which are currently needed to display information on a display screen;

providing to the client by the server the requested subset of glyphs which are currently needed to display the information and at least one further glyph which is not currently needed to display the information, as determined by at least one selection criterion at the server, wherein the step of providing comprises providing a font file of predetermined format which is sparsely populated with the requested subset and the at least one further glyph, wherein the request from the client includes an indication of glyphs present at the client, and wherein the request from the client also includes an indication of how often the glyphs present at the client have been accessed by the client.

2. A system for font building, comprising:

a client computer system;

a server computer system;

means for requesting by the client from the server a subset of glyphs from a font, the subset of glyphs being ones which are currently needed to display information on a display screen;

means for providing to the client by the server the requested subset of glyphs which are currently needed to display the information and at least one further glyph which is not currently needed to display the information, as determined by at least one selection criterion at the server, wherein the means for providing comprises means for providing a font file of predetermined format which is sparsely populated with the requested subset and the at least one further glyph, wherein the request from the client includes an indication of glyphs present at the client, and wherein the request from the client also includes an indication of how often the glyphs present at the client have been accessed by the client.

3. A method of font building at a client computer system cooperating with a server computer system, the method comprising:

requesting by the client from the server a subset of glyphs from a font, the subset of glyphs being ones which are currently needed to display information on a display screen;

providing to the client by the server the requested subset of glyphs which are currently needed to display the information and at least one further glyph which is not currently needed to display the information, as determined by at least one selection criterion at the server, and further comprising at the server adjusting for download time the number of glyphs provided together to the client.

4. A method of font building at a client computer system cooperating with a server computer system, the method comprising:

requesting by the client from the server a subset of glyphs from a font, the subset of glyphs being ones which are currently needed to display information on a display screen;

providing to the client by the server the requested subset of glyphs which are currently needed to display the information and at least one further glyph which is not currently needed to display the information, as determined by at least one selection criterion at the server, and further comprising at the server reorganizing groups of glyphs if their request frequency changes over time.

* * * * *